United States Patent [19]
Jay

[11] Patent Number: 4,861,044
[45] Date of Patent: Aug. 29, 1989

[54] HYGENIENIC SHAFT SEAL FOR A FOOD PROCESSING VAT

[75] Inventor: Jeffrey L. Jay, Winsted, Minn.

[73] Assignee: Scherping Systems, Inc., Winsted, Minn.

[21] Appl. No.: 269,154

[22] Filed: Nov. 9, 1988

[51] Int. Cl.$^4$ .......................... F16J 15/32; F16J 15/34
[52] U.S. Cl. ........................................ 277/24; 277/15;
277/75; 277/84; 277/152
[58] Field of Search ...................... 277/15, 24, 70, 71,
277/72 R, 72 FM, 75, 76, 84, 152

[56] References Cited

U.S. PATENT DOCUMENTS

| | | | |
|---|---|---|---|
| 2,572,422 | 10/1951 | Agger | 277/70 X |
| 2,824,759 | 2/1958 | Tracy | 277/15 |
| 4,136,886 | 1/1979 | Sjoholm et al. | 277/24 |

FOREIGN PATENT DOCUMENTS

| | | | |
|---|---|---|---|
| 1923954 | 11/1970 | Fed. Rep. of Germany | 277/24 |
| 2414634 | 10/1974 | Fed. Rep. of Germany | 277/84 |
| 723274 | 3/1980 | U.S.S.R. | 277/152 |

*Primary Examiner*—Robert S. Ward
*Attorney, Agent, or Firm*—Dorsey & Whitney

[57] ABSTRACT

A hygienic shaft seal for a food processing vat is comprised of an annular seal adapted to be inserted into an aperture in a wall of the vat having a shaft extending therethrough for surrounding the shaft and preventing contamination of the food product contents of the vat, yet still allowing for contaminants to be easily flushed from the seal. The seal is secured such that the seal is stationary with respect to the rotation of the shaft and includes an outer lip means for abutably engaging a portion of the shaft disposed in the aperture and an inner lip means for abutably engaging an annular flange on the rotatable shaft adjacent to the interior side of the wall. The seal, the inner lip means and the outer lip means define an annular channel around the shaft. An access port means is provided for accessing the annular channel from the exterior of the vat whereby a cleaning solution may be introduced into the annular channel under pressure to force the inner lip means away from the annular flange and flush any contaminants or residual food product present in the annular channel into the interior of the vat. The pressure of the cleaning fluid also forces the outer lip means to seal more tightly against the portion of the shaft disposed in the aperture to prevent the loss of the cleaning solution along the shaft to the exterior of the vat.

12 Claims, 1 Drawing Sheet

HYGENIENIC SHAFT SEAL FOR A FOOD PROCESSING VAT

TECHNICAL FIELD

The present invention relates generally to the field of food processing equipment. More particularly, the present invention relates to a hygenienic shaft seal for a food processing vat for processing liquid-type food products such as cheeses that defines an annular channel surrounding the shaft with an access port for introducing a cleaning solution into the annular channel for flushing contaminants from the seal.

BACKGROUND OF THE INVENTION

The need for a hygenienic shaft seal for a shaft that extends into the interior of a food processing vat and is driven from the outside of the vat is well known. To be hygeneinic, a seal for such a shaft must prevent contaminants from entering the interior of the vat during the processing of the particular food product. In addition, the seal must allow the contaminants and any residual food product to be flushed from the seal during cleaning of the vat after processing of the particular food product is complete.

U.S. Pat. No. 4,136,886 describes an arrangement for cleaning a sealing ring for use in the processing of jam that is comprised of a first and a second sealing ring adapted for rotation with the shaft that define a cleaning channel between the two rings that may be flushed with a cleaning liquid. This design has been ineffective because of problems in securing the sealing rings to the shaft and because of difficulties in maintaining the hygeinic nature of the seal due to the large number of components and crevices formed between the components that make cleaning the seal difficult. In addition, the design of and number of components of such a seal is makes the seal difficult to manufacture and repair.

Accordingly, it would be advantageous to have a hygeneinic shaft seal for a food processing vat that is easier to construct and maintain and minimizes the risk of contamination to the food in the vat, yet still allows contaminants and residual food product to be easily flushed from the seal.

SUMMARY OF THE INVENTION

The present invention is directed to an hygenienic shaft seal for a food processing vat having a wall with an aperture therein and a shaft extending through the aperture into the interior of the vat. The hygenienic shaft seal of the present invention is an annular seal adapted to be inserted into the aperture for surrounding the shaft and is secured such that the seal is stationary with respect to the rotation of the shaft. The seal includes an outer lip means for abutably engaging a portion of the shaft disposed in the aperture and an inner lip means for abutably engaging an annular flange on the rotatable shaft adjacent to the interior side of the wall. The seal, the inner lip means and the outer lip means define an annular channel around the shaft. An access port means is provided for accessing the annular channel from the exterior of the vat whereby a cleaning solution may be introduced into the annular channel under pressure to force the inner lip means away from the annular flange and flush any contaminants or residual food product present in the annular channel into the interior of the vat. The pressure of the cleaning fluid also forces the outer lip means to seal more tightly against the portion of the shaft disposed in the aperture to prevent the loss of the cleaning solution along the shaft to the exterior of the vat.

Accordingly, a primary objective of the present invention is to provide a hygeneinic shaft seal for a food processing vat that minimizes the risk of contamination to the food product in the vat, yet still allows contaminants and residual food product to be easily flushed from the seal.

Another objective of the present invention is to provide a hygenienic shaft seal for a food processing vat that is easier to construct and maintain.

A further objective of the present invention is to provide a hygenienic shaft seal for a food processing vat that is stationary with respect to the shaft and defines an annular channel for flushing contaminants from the seal.

Another objective of the present invention is to provide a means for monitoring leakage from the seal during the food processing operation.

A further objective of the present invention is to provide a hygenienic shaft seal that has fewer components and fewer crevices in its design.

These and other objectives of the present invention will become apparent with reference to the drawings, the description of the preferred embodiment and the appended claims.

DESCRIPTION OF THE PREFERRED EMBODIMENT

Figure 1:
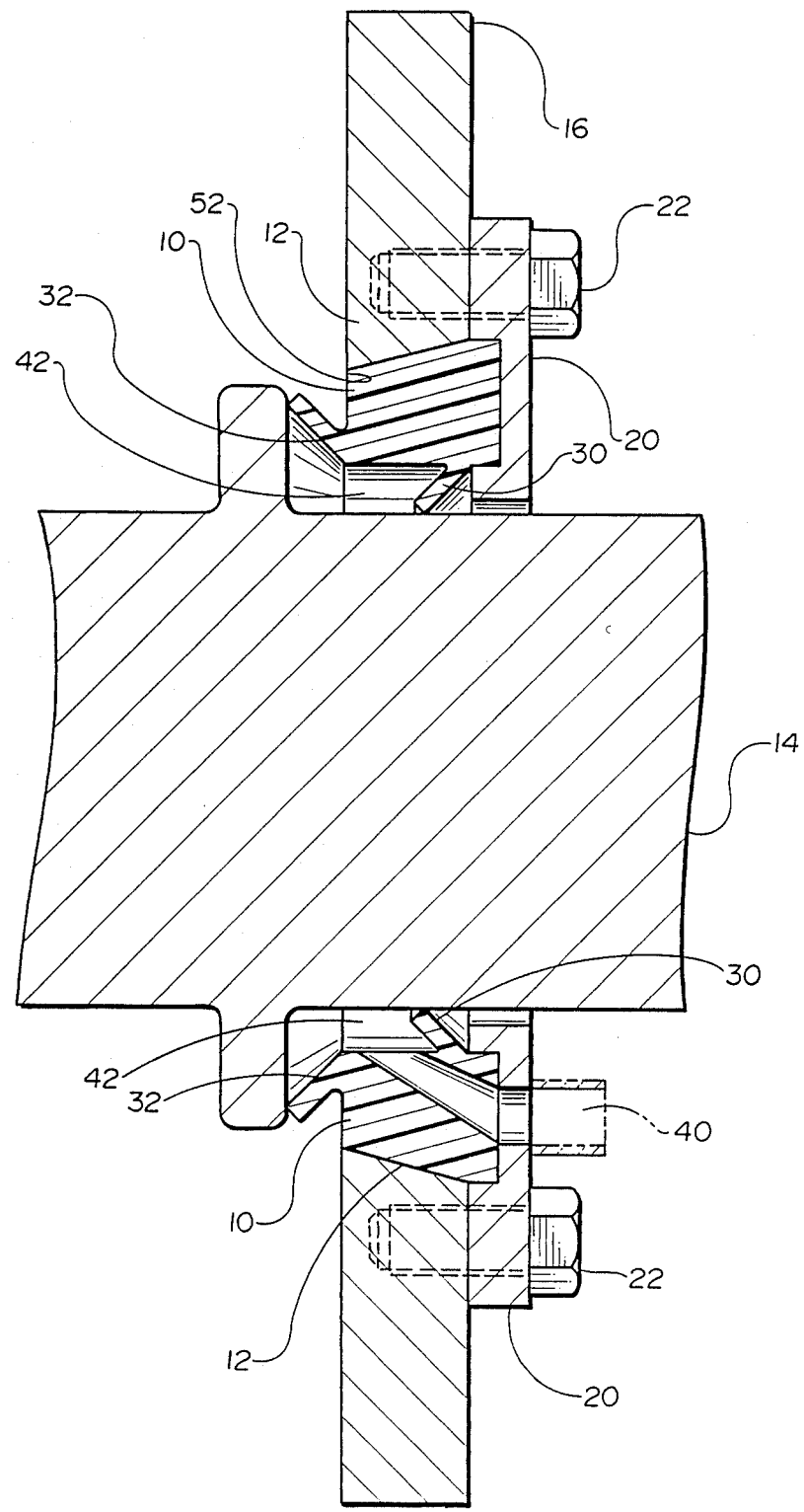
FIG. 1 is a fragmentary sectional elevation orthocological to the axis of the shaft as it penetrates the end wall of a vat showing the preferred embodiment of the seal of the present invention.

The hygenienic shaft seal of the present invention is designed to be used with any type of a food processing vat where a rotational shaft extends through a wall of a vat. The shaft may be either horizontally or vertically oriented. Possible applications for the vat include processing food products, particularly liquid-type food products, beverages and even pharmaceutical products. In the preferred embodiment of the present invention, the seal 10 is used at each end section of a multi-shaft horizontally oriented food processing vat.

Referring now to FIG. 1, the elements of the preferred embodiment of a hygenienic shaft seal 10 for a food processing vat in accordance with the present invention will be described. The seal 10 is constructed to minimize the leakage of the vat contents from the interior of the vat 10, while at the same time allowing the seal 10 to be cleaned to maintain hygienic conditions. The seal 10 is mounted in a tapered aperture 12 larger than the diameter of the shaft 14 in the end wall 16 of the vat (not shown). The seal 10 is held in place by an external seal retaining ring 20 secured to the outside of the end wall 16 by a series of mounting bolts 22. The seal 10 may also by held in place such that the seal 10 is stationary with respect to the rotation of the shaft 14 by any number of means for securing the seal, including interlocking abutments and apertures in the aperture 12 in the wall 16, the use of an adhesive between the seal 10 and the aperture 12, or the use of a seal retaining ring 20 secured by other means such as welding. While a tapered aperture 12 is preferred, it will be seen that other types of apertures may work equally as well with other type of means for securing the seal 10.

The seal 10 is made of flexible, non-porous material such as rubber or plastic. In the preferred embodiment, the seal 10 is molded from a food grade polymer such as Viton (trademark). In another embodiment, the seal 10 may be machined from T.F.E., a fluoropolymer. The seal 10 includes an outer lip 30 in angular contact from the exterior to the interior of the vat 10 with the shaft 14. The seal 10 also include an inner lip 32 that is an angular contact with a step-in annular flange 18 on the shaft 14 positioned adjacent to the and just inside of the end wall 16. The inner lip 32 is angled outward from the surface of the shaft to engage the surface of the flange 18 that is facing the seal 10. In the preferred embodiment, the outer lip 30 is oriented at a 45 degree with the surface of the seal 10 facing the interior of the vat and the inner lip 32 is oriented at a 45 degree angle with respect to the surface of the seal adjacent the shaft 14. The distance between the inner surface 50 of the seal 10 and the shaft 14 and the distance between interior surface 52 of the seal 10 and the shaft 14 are equi-distant and approximately ¼ inch. The thickness of both the outer lip 30 and the inner lip 32 is 3/32 inch.

The arrangement of the outer lip 30 and inner lip 32 allows for a longer wear life of the seal 10 because the primary seal is achieved by the interface between the annular flange 18 and the outer lip 32. The interface between the annular flange 18 and the outer lip 32 can be mechanically compressed further in the direction parallel to the axis of the shaft 14 than could be easily obtained if the pressure of th lip was being applied directly against the shaft 14 in a direction perpendicular to the axis of the shaft.

The seal 10 further includes a cleaning port 40 that allows for the entry of a cleaning fluid into the annular channel 42 defined between the outer lip 30 and the inner lip 32 of the seal 10. In the preferred embodiment, the cleaning port 40 extends through the body of the seal 10 and also through the seal retaining ring 20 presenting an opening of the exterior of the vat that may be coupled to a pipe (not shown) for supplying the cleaning fluid. The cleaning port 40 may also be monitored during the food processing cycle for any leakage of food product into the shaft past the inner lip 32. It will be seen that the presence of both the inner lip 32 and the outer lip 30 serves as a double protection against the food product escaping along the shaft 14 to the exterior of the vat.

In operation, the seal 10 is positioned in the tapered aperture 12 so that the flange 18 compresses the inner lip 32 to form a leak proof joint between the interior of the vat and the seal 10. The annular flange 18 also aids in positioning the shaft 14 with respect to the seal 10 and the aperture 12. Outer lip 30 forms a further seal to prevent the escape of the contents of the vat around the shaft 18. In the event that the contents of the vat leak through the seal formed by the inner lip 32, the leakage may be detected at the cleaning port 40 and the seal 10 may be replaced after the current cycle of food processing is complete. The seal 10 may be cleaned after each cycle of food processing by introducing a cleaning fluid under pressure into the annular channel 42 through the cleaning port 40. The pressure causes the inner lip 32 to lift away from the flange 18 and allows any contaminants or residual food product to be flushed into the interior of the vat for cleaning. The same pressure also increase the seal of the outer lip 30 on the shaft 14, thereby preventing the cleaning solution from escaping along the shaft to the exterior of the vat and coming into contact with the bearings (not shown) associated with driving the shaft 14.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

I claim:

1. A hygienienic shaft seal for a food processing vat having a wall with an aperture therein and a rotatable shaft passing through the aperture and into the interior of the vat, comprising:

an annular seal adapted to be inserted into the aperture for surrounding the shaft, the seal having an outer lip means for abutably engaging a portion of the shaft disposed in the aperture and an inner lip means for abutably engaging an annular flange on the rotatable shaft adjacent to the interior side of the wall, the seal, the inner lip means and the outer lip means forming an annular channel around the shaft;

means for securing the seal in the aperture such that the seal is stationary with respect to the rotation of the shaft; and an access port means for accessing the annular channel from the exterior of the vat, whereby a cleaning solution may be introduced into the annular channel under pressure to force the inner lip means away from the annular flange and flush any contaminants present in the annular channel into the interior of the vat and to force the outer lip means to seal more tightly against the portion of the shaft disposed in the aperture to prevent the loss of the cleaning solution along the shaft to the exterior of the vat.

2. The seal of claim 1 wherein the annular seal is molded from a polymer or rubber material.

3. The seal of claim 2 wherein the material is a food grade polymer.

4. The seal of claim 1 wherein the annular seal is machined from a suitable polymer resin.

5. The seal of claim 1 wherein the outer lip means is angled radially toward the interior of the vat and toward the axis of the shaft.

6. The seal of claim 1 wherein the inner lip means is angled radially toward the interior of the vat and away from the axis of the shaft.

7. The seal of claim 1 wherein the aperture in the aperture in the wall of the vat is tapered from the exterior to the interior of the vat.

8. The seal of claim 1 wherein the means for securing the seal is comprised of a seal retaining ring abutably engaging the surface of the seal on the exterior side of the aperture and operably connected to the exterior of the wall of the vat.

9. The seal of claim 8 wherein the seal retaining ring further comprises an annular retaining channel for engaging the seal.

10. The seal of claim 1 wherein the access port means is comprised of a passageway through the seal from the annular channel in the seal to the surface of the seal on the exterior side of the aperture.

11. The seal of claim 10 wherein the passageway extends through the means for securing the seal.

12. The seal of claim 10 wherein the passageway extends through the wall of the vat.

* * * * *